(12) United States Patent
Nagarajan et al.

(10) Patent No.: US 10,291,433 B2
(45) Date of Patent: May 14, 2019

(54) SIGNALING MULTICAST INFORMATION TO A REDUNDANT MULTI-HOMING ROUTER FOR A LAYER 2 VIRTUAL PRIVATE NETWORK

(71) Applicant: Juniper Networks, Inc., Sunnyvale, CA (US)

(72) Inventors: Vikram Nagarajan, Bangalore (IN); Robert W. Kebler, Newburyport, MA (US); Kapil Arora, Bangalore (IN); Naveen Ashik, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 61 days.

(21) Appl. No.: 15/644,274

(22) Filed: Jul. 7, 2017

(65) Prior Publication Data

US 2019/0013966 A1 Jan. 10, 2019

(51) Int. Cl.
*H04L 12/707* (2013.01)
*H04L 12/46* (2006.01)
(Continued)

(52) U.S. Cl.
CPC ........ *H04L 12/4641* (2013.01); *H04L 12/185* (2013.01); *H04L 12/462* (2013.01); *H04L 12/4675* (2013.01); *H04L 45/16* (2013.01); *H04L 45/28* (2013.01); *H04L 45/50* (2013.01); *H04L 45/66* (2013.01); *H04L 45/68* (2013.01); *H04L 45/74* (2013.01)

(58) Field of Classification Search
CPC .............................. H04L 12/4641; H04L 41/16
See application file for complete search history.

(56) References Cited

U.S. PATENT DOCUMENTS 7,519,735 B1 * 4/2009 Ju ........................... H04L 45/00
                                                            709/238
7,796,593 B1 * 9/2010 Ghosh ................ H04L 12/4633
                                                            370/389

(Continued)

OTHER PUBLICATIONS

Bryant et al., "Pseudo Wire Emulation Edge-to-Edge (PWE3) Architecture," Network Working Group, RFC 3985, Mar. 2005, 42 pp.

(Continued)

*Primary Examiner* — Parth Patel
(74) *Attorney, Agent, or Firm* — Shumaker & Sieffert, P.A.

(57) ABSTRACT

In some examples, a customer edge device (CE) is configured to receive configuration data for multi-homed connectivity for a local layer 2 (L2) network with a L2 virtual private network (L2VPN) for a layer 3 (L3) network for switching L2 packet data units (PDUs) among two or more L2 networks connected to the L3 network including the local L2 network, wherein the configuration data for multi-homed connectivity configures the CE with a primary attachment circuit to a primary neighbor provider edge device (PE) for the L2VPN and with a backup attachment circuit to a backup neighbor PE for the L2VPN; and generate and send, in response to snooping a multicast join message indicating a multicast group, a control plane message via the backup attachment circuit to the backup neighbor PE for the L2VPN, wherein the control plane message is destined for the backup neighbor PE for the L2VPN.

21 Claims, 6 Drawing Sheets

(51) Int. Cl.
*H04L 12/761* (2013.01)
*H04L 12/721* (2013.01)
*H04L 12/741* (2013.01)
*H04L 12/18* (2006.01)
*H04L 12/703* (2013.01)
*H04L 12/723* (2013.01)

(56) References Cited

U.S. PATENT DOCUMENTS

| | | | | |
|---|---|---|---|---|
| 8,054,840 B2* | 11/2011 | Booth | | H04L 12/4641 370/395.53 |
| 8,085,791 B1* | 12/2011 | Aggarwal | | H04L 45/68 370/392 |
| 8,724,629 B1* | 5/2014 | Goli | | H04L 12/4625 370/392 |
| 8,787,149 B1* | 7/2014 | Ramanathan | | H04L 45/58 370/216 |
| 8,953,590 B1 | 2/2015 | Aggarwal et al. | | |
| 9,019,814 B1* | 4/2015 | Mohanty | | H04L 45/00 370/219 |
| 9,590,824 B1* | 3/2017 | Sikand | | H04L 12/4666 |
| 2007/0140271 A1* | 6/2007 | Amante | | H04L 45/00 370/401 |
| 2009/0037607 A1* | 2/2009 | Farinacci | | H04L 12/4641 709/249 |
| 2011/0032945 A1* | 2/2011 | Mullooly | | H04L 45/58 370/401 |
| 2012/0131216 A1* | 5/2012 | Jain | | H04L 45/04 709/230 |
| 2012/0257623 A1* | 10/2012 | Huang | | H04L 12/56 370/390 |
| 2013/0235876 A1* | 9/2013 | Sajassi | | H04L 41/12 370/401 |
| 2013/0266008 A1* | 10/2013 | Xue | | H04L 12/4641 370/389 |
| 2014/0160919 A1* | 6/2014 | Kar | | H04W 24/04 370/220 |
| 2014/0211792 A1* | 7/2014 | Li | | H04L 49/552 370/389 |
| 2014/0254395 A1* | 9/2014 | Pugaczewski | | H04L 43/50 370/250 |
| 2014/0334292 A1* | 11/2014 | Chang | | H04W 24/04 370/225 |
| 2014/0372582 A1* | 12/2014 | Ghanwani | | H04L 45/64 709/223 |
| 2015/0006757 A1* | 1/2015 | Boutros | | H04L 45/14 709/242 |
| 2015/0195178 A1* | 7/2015 | Bhattacharya | | H04L 45/745 718/1 |
| 2015/0207671 A1* | 7/2015 | Farkas | | H04L 45/48 370/228 |
| 2015/0350912 A1* | 12/2015 | Head | | H04W 12/08 726/4 |
| 2016/0127454 A1* | 5/2016 | Maheshwari | | H04L 47/70 709/223 |
| 2016/0261487 A1* | 9/2016 | Singh | | H04L 12/4641 |
| 2017/0093612 A1 | 3/2017 | Singh et al. | | |
| 2017/0093695 A1 | 3/2017 | Kebler et al. | | |
| 2017/0118043 A1* | 4/2017 | Hao | | H04L 12/4633 |
| 2018/0123944 A1* | 5/2018 | Jeyasekaran | | H04L 43/10 |
| 2018/0219769 A1* | 8/2018 | Uttaro | | H04L 45/38 |
| 2018/0219802 A1* | 8/2018 | Uttaro | | H04L 49/70 |

OTHER PUBLICATIONS

Andersson et al., "LDP Specification," Internet Engineering Task Force Network Working Group, RFC 5036, Oct. 2007, 135 pp.

"White Paper—LDP-BGP VPLS Interworking," Juniper Networks, Inc., Oct. 2010, 35 pp.

Extended Search Report from counterpart European Application No. 18180543.3, dated Oct. 9, 2018, 14 pp.

* cited by examiner

SIGNALING MULTICAST INFORMATION TO A REDUNDANT MULTI-HOMING ROUTER FOR A LAYER 2 VIRTUAL PRIVATE NETWORK

TECHNICAL FIELD

The disclosure relates to computer networks and, more specifically, to delivering multicast traffic.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches or other L2 network devices. The Ethernet switches forward Ethernet frames, also referred to as L2 communications or L2 packets, to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables associated with each of their physical interfaces. When forwarding an individual Ethernet frame received on an ingress port of an Ethernet switch, the Ethernet switch typically multicasts the Ethernet frame to all of the other physical ports of the switch, unless the Ethernet switch has learned the specific physical port through which the destination MAC address devices is reachable. In this case, the Ethernet switch forwards a single copy of the Ethernet frame out the associated physical port.

Service provider networks provide layer 2 virtual private networking (L2VPN) services to connect customer networks over a wide area network. Example L2VPN services include Layer 2 circuits and Virtual Private Local Area Network (LAN) Service (VPLS).

SUMMARY

In general, techniques are described for signaling indications of interested multicast receivers to a network device that is configured to provide, for a multi-homed network device, a backup connection to a layer 2 virtual private network. For example, network devices of an intermediate layer 3 (L3) network may be configured with a layer 2 (L2) virtual private network (L2VPN), such as an L2 circuit or a Virtual Private Local Area Network (LAN) Service (VPLS), to provide L2 connectivity between multiple L2 networks (or "customer network") logically separated by the intermediate layer 3 (L3) network. A customer edge device (CE) of one of the L2 networks may be multi-homed to provider edge devices (PEs) of the intermediate L3 network with a primary attachment circuit to a primary PE and a backup attachment circuit to a backup PE. The primary attachment circuit is active to transmit network traffic between the intermediate L3 network and the CE for the L2VPN, with the backup attachment circuit and backup PE acting as a backup to assume transmitting network traffic in the event of failure of the primary attachment circuit.

The CE snoops multicast signaling (e.g., Internet Group Management Protocol (IGMP)) traffic from hosts of the L2 network that includes the CE. In response to determining from the IGMP traffic that a host of the L2 network is seeking to join a multicast group to receive multicast traffic from a multicast source, the CE generates and sends a control plane message on the backup attachment circuit to the backup PE. The message includes an indication of the multicast group that is an indication of the interested host for receiving multicast traffic for the multicast group. The backup PE receives the message and responsively stores multicast forwarding state for the multicast group. In the event of failure of the primary attachment circuit, the backup PE uses the stored multicast forwarding state to rapidly switchover to begin forwarding multicast traffic for the multicast group via the backup attachment circuit (now the primary attachment circuit) to the CE.

The techniques may provide one or more advantages. For example, by proactively configuring the backup PE with multicast forwarding state using explicit control plane messaging, the CE and backup PE may provide more rapid assumption of multicast traffic forwarding from the backup PE to the CE in the event of failure of the primary attachment circuit. In the absence of such proactive configuring, the backup PE must snoop subsequent IGMP traffic from the host to determine that backup PE is to forward multicast traffic to the CE via the backup attachment circuit, which results in blackholing of the hosts behind the CE for multicast traffic via the L2VPN until an IGMP refresh occurs. The techniques may reduce such blackholing. Moreover, the explicit control plane messaging techniques may provide advantages over the CE sending redundant IGMP traffic to the backup PE via the backup attachment circuit. For example, generating and sending an explicit control plane message by the CE may reduce subsequent redundant IGMP traffic from the CE to the backup PE. As another example, the backup PE receives an explicit control plane message and may avoid unnecessarily snooping for IGMP traffic in the data plane.

In some examples, a method comprises receiving, by a provider edge device of a layer 3 (L3) network, configuration data for a layer 2 (L2) virtual private network (L2VPN) for the L3 network for switching L2 packet data units (PDUs) among two or more L2 networks connected to the L3 network, wherein the configuration data configures the provider edge device as a neighbor having a redundant attachment circuit, for the L2VPN, with a customer edge device of a local L2 network of the two or more L2 networks; receiving, by the provider edge device from the customer edge device via the redundant attachment circuit, when the provider edge device is a backup neighbor for the customer edge device, a control plane message destined for the provider edge device, the control plane message indicating a multicast group; and forwarding, by the provider edge device to the customer edge device via the redundant attachment circuit for the L2VPN and based at least on the control plane message, multicast traffic for the multicast group received from the L3 network.

In some examples, a method comprises receiving, by a customer edge device of a local layer 2 (L2) network, configuration data for multi-homed connectivity with a layer 2 (L2) virtual private network (L2VPN) for a layer 3 (L3) network for switching L2 packet data units (PDUs) among two or more L2 networks connected to the L3 network including the local L2 network, wherein the configuration data for multi-homed connectivity configures the customer edge device with a primary attachment circuit to a primary neighbor provider edge device for the L2VPN and with a backup attachment circuit to a backup neighbor provider edge device for the L2VPN; and generating and sending, by the customer edge device in response to snooping a multicast join message indicating a multicast group, a control plane message via the backup attachment circuit to the backup neighbor provider edge device for the L2VPN, wherein the control plane message is destined for the backup neighbor provider edge device for the L2VPN.

In some examples, a system comprises a backup neighbor provider edge device, of a layer 3 network, configured to provide a layer 2 (L2) virtual private network (L2VPN) for the L3 network for switching L2 packet data units (PDUs) among two or more L2 networks connected to the L3 network; a customer edge device of a local L2 network of the two or more L2 networks, the customer edge device configured with multi-homed connectivity with a primary attachment circuit to a primary neighbor provider edge device for the L2VPN and with a backup attachment circuit to the backup neighbor provider edge device, wherein the customer edge device is configured to generate and send, in response to a snoop of a multicast join message indicating a multicast group, a control plane message via the backup attachment circuit to the backup neighbor provider edge device, wherein the control plane message is destined for the backup neighbor provider edge device, wherein the backup neighbor provider edge device is configured to forward, to the customer edge device via the backup attachment circuit for the L2VPN and based at least on the control plane message, multicast traffic for the multicast group received from the L3 network.

In some examples, a customer edge device comprises processing circuitry operably coupled to a memory comprising instructions for causing the processing circuitry to: receive configuration data for multi-homed connectivity for a local layer 2 (L2) network with a L2 virtual private network (L2VPN) for a layer 3 (L3) network for switching L2 packet data units (PDUs) among two or more L2 networks connected to the L3 network including the local L2 network, wherein the configuration data for multi-homed connectivity configures the customer edge device with a primary attachment circuit to a primary neighbor provider edge device for the L2VPN and with a backup attachment circuit to a backup neighbor provider edge device for the L2VPN; and generate and send, in response to snooping a multicast join message indicating a multicast group, a control plane message via the backup attachment circuit to the backup neighbor provider edge device for the L2VPN, wherein the control plane message is destined for the backup neighbor provider edge device for the L2VPN.

The details of one or more examples of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the description and figures.

DETAILED DESCRIPTION

Figure 1:
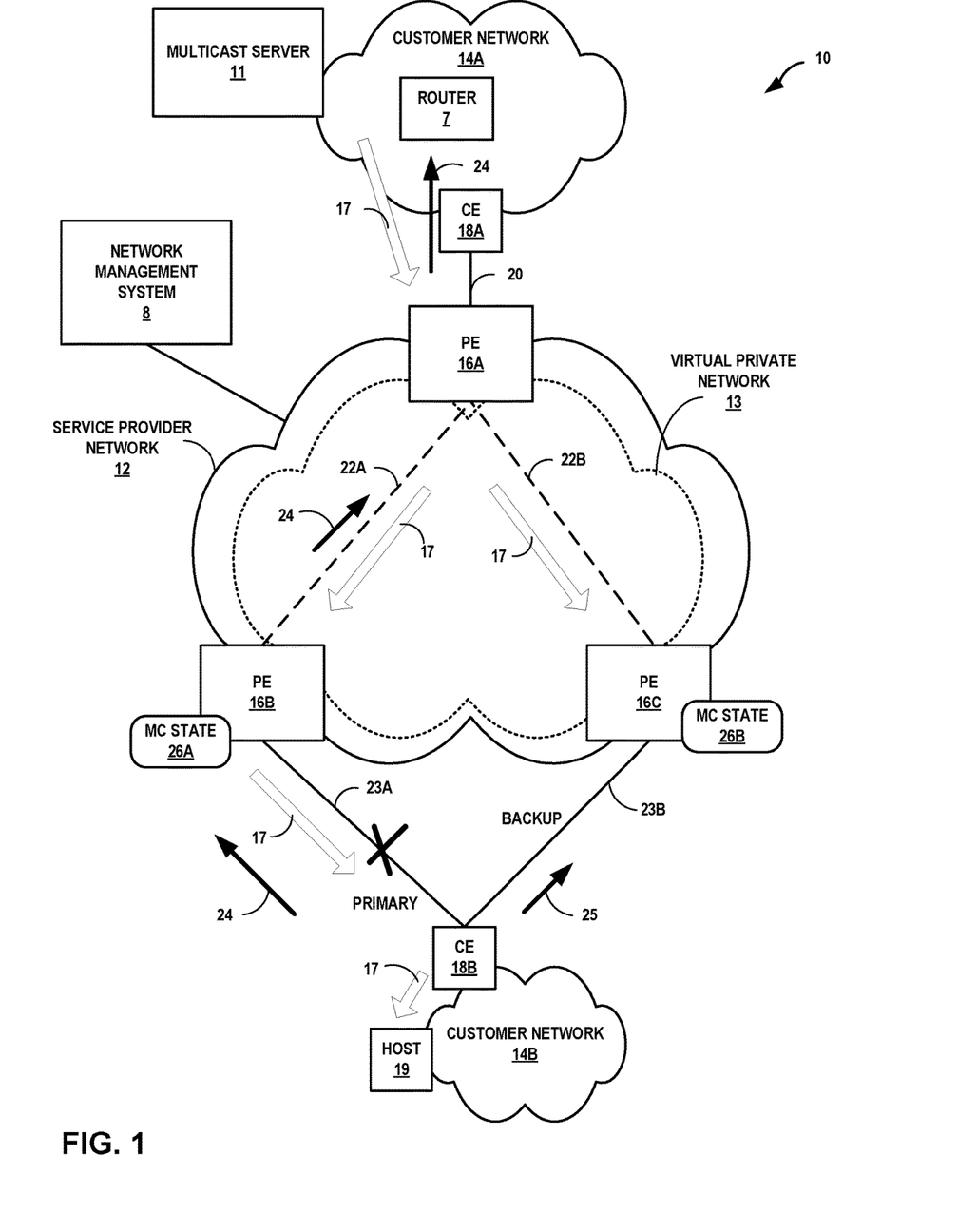
FIGS. 1-2 are block diagrams illustrating an example network system according to the techniques described herein.
Figure 2:
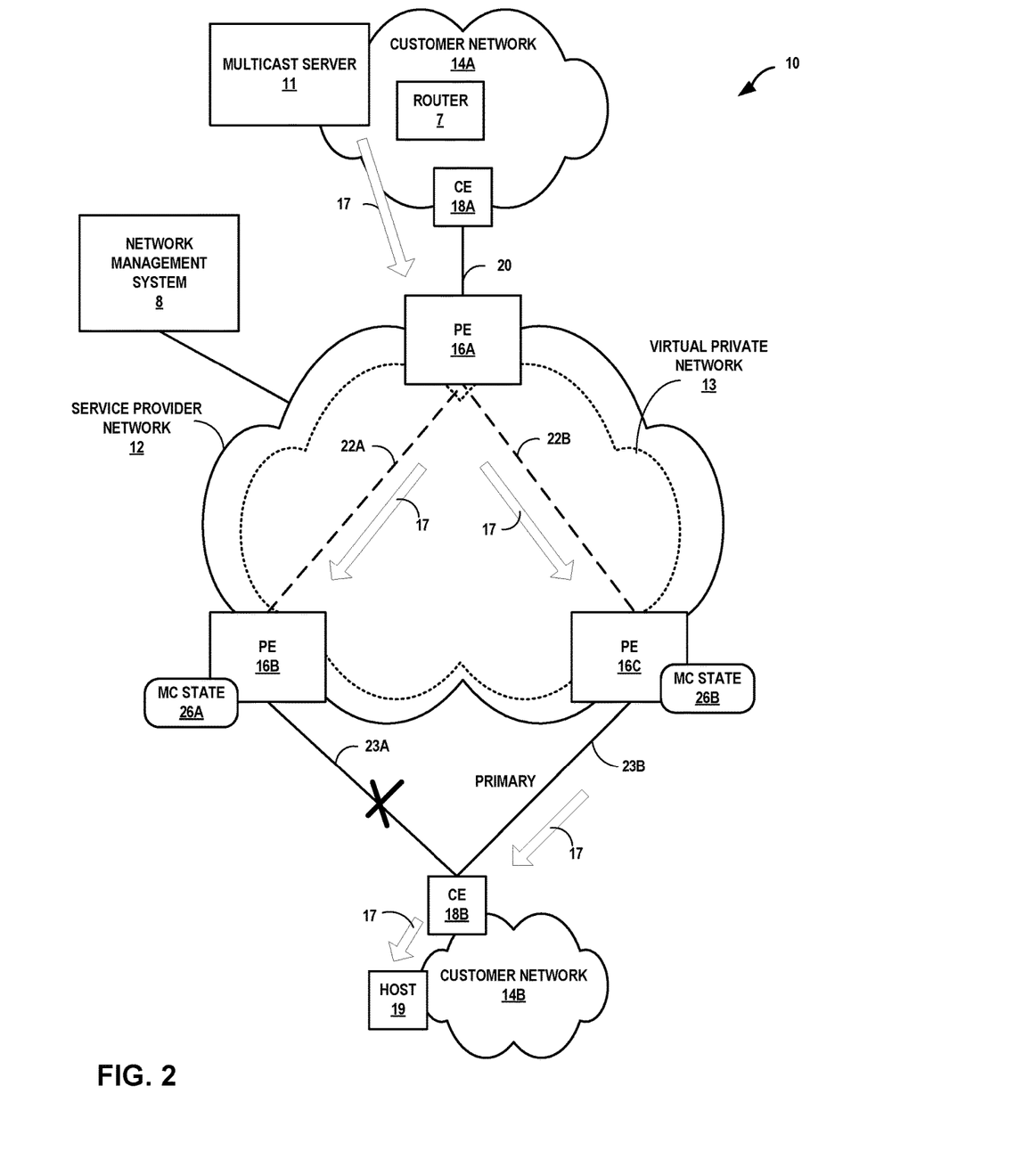

FIGS. 1-2 are block diagrams illustrating an example network system, according to techniques described herein. As shown in FIGS. 1-2, network system 10 includes a network 12 and customer networks 14A-14B ("customer networks 14"). Network 12 may represent a layer 3 (L3) network that is owned and operated by a service provider to interconnect a plurality of edge networks, such as customer networks 14. As a result, network 12 may be referred to herein as a "Service Provider (SP) network" or, alternatively, as an "intermediate network" or "core network" in that network 12 acts as a core to interconnect access networks that service customer networks 14.

These service providers may lease portions of network 12 to provide switching (or bridging) services offering L2 connectivity through network 12 to customer networks 14, which may lease the portions or purchase the services provided by network 12 to create a Layer 2 Virtual Private Network (L2VPN) interconnecting the various layer 2 (L2) customer networks 14. In some examples, the L2VPN is a multipoint-to-multipoint L2 service such as a Virtual Private Local Area Network (LAN) Service (VPLS), Ethernet Private LAN (EPLAN), Ethernet Virtual Private LAN (EVPLAN), or another multipoint-to-multipoint L2 service.

In some examples, the L2VPN is a point-to-point L2 service or L2 circuit, such as an Multiprotocol Label Switching (MPLS) L2 circuit, Generic Route Encapsulation (GRE) L2 circuit, a pseudowire, Ethernet Private Line (EPL), Ethernet Virtual Private Line (EVPL), Ethernet Wire Service (EWS), Ethernet Relay Service (ERS), or other L2 circuit configured in network 12 to provide L2 connectivity using a tunneling protocol. An L2 circuit is a point-to-point L2 connection that transports traffic using a leased line, a layer 2 connection, or using MPLS or another tunneling technology on the service provider network 12. The L2 circuit is a virtual connection for delivering traffic between two customer edge (CE) 18 devices across service provider network 12. Reference to layers followed by a numeral may refer to a particular layer of the Open Systems Interconnection (OSI) model or Transmission Control Protocol (TCP)/Internet Protocol (IP) model.

In the illustrated instance, network 12 provides L2VPN 13 to transparently interconnect customer networks 14, to one another via service provider network 12. Network 12 may provide the L2VPN 13 to the customer networks 14 by transparently emulating a direct connection between these various customer networks 14 such that, from the perspective of customer networks 14, each of customer networks 14 appears to directly connect to one another at layer 2. Moreover, different L2VPN instances may be configured in and implemented by PEs 16 within network 12 for different customers of the service provider.

Customer networks 14 may each represent a network owned and operated by a large entity, such as a university, corporation, business, or other facility or enterprise. In some instances, a single large entity may own and operate two or more of customer networks 14. The entity may then contract with service provider network 12 to provide a service offered by service provider network 12, such as the L2VPN 13, in order to transparently interconnect these networks 14 as described above.

Each of customer networks 14 may operate according to a variety of network protocols, such as any of the 802.3X family of network protocols related to the Ethernet protocol, any of the 802.1X family of wireless networking protocols, an Internet Protocol (IP) protocol, and TCP. Moreover, one or more of customer networks 14 may comprise a Virtual Private Network (VPN), a Large Area Network (LAN), or a Wide Area Network (WAN). Customer network 14B includes a host computing device 19 that requests and receives multicast traffic. Customer network 14 includes a multicast server 11 that serves multicast traffic. Multicast server 11 may represent a real or virtual server. Content delivered in multicast traffic may include, for example, video, audio, data, voice, or any combination thereof.

Although not shown in FIGS. 1-2 for ease of illustration purposes, each of customer networks 14 may also include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

Network 12 includes a plurality of provider edge (PE) devices 16A-16C ("PEs 16") that reside at an edge of service provider network 12. While discussed herein with primarily respect to a particular network device, i.e., a router, PEs 16 may each represent any network device that interfaces with a network, such as one of customer networks 14 and other devices of service provider network 12, to route, switch, bridge or otherwise forward network traffic directed to or originating from the network. For example, PEs 16 may each represent, in certain instances, one or more of a switch, a hub, a bridge device (e.g., an Ethernet bridge), or any other L2 network device and, in some instances, L3 network devices capable of performing L2 functionality.

Each of customer networks 14 also include a corresponding one of a plurality of customer edge (CE) routers 18A-18B ("CEs 18") that reside at an edge of the customer network 14. Like PEs 16, CEs 18, while discussed herein with respect to a particular network device, i.e., a router, may each represent any network device that interfaces with a network, such as service provider network 12 and other devices of customer networks 14, to bridge, switch or otherwise forward network traffic directed to or originating from the network. For example, CEs 18 may each represent, in certain instances, one or more of a switch, a hub, a bridge device (e.g., an Ethernet bridge), or any other L2 network device and, in some instances, L3 network devices capable of performing L2 functionality.

PE 16A couples to CE 18A of customer networks 14A via attachment circuit 20. Multi-homing PEs 16B-16C provide multi-homed connectivity for CE 18B (and customer network 14B) to access VPN 13. Attachment circuit 23A couples CE 18B and PE 16B. Attachment circuit 23B couples CE 18B and PE 16C. Each of ACs 23A, 23B, and 20 is a physical or virtual L2 circuit such as an Ethernet pseudowire, a Frame Relay data link connection, an asynchronous transfer mode (ATM) Virtual Path Identifier (VPI)/Virtual Channel Identifier (VCI), an Ethernet port, a VLAN, a Point-to-Point Protocol (PPP) connection on a physical interface, a PPP session from an L2 Tunneling Protocol (L2TP) tunnel, or a Multiprotocol Label Switching (MPLS) Label Switched Path (LSP), a Generic Route Encapsulation (GRE) tunnel, or another interface with bridged encapsulation. A pseudowire is an L2 virtual circuit to carry Ethernet or 802.3 Protocol Data Units (PDUs) to offer emulated Ethernet services. Ethernet or 802.3 PDUs are encapsulated within the pseudowire to provide a point-to-point Ethernet service. Pseudowire service emulation is described in additional detail in "Pseudo Wire Emulation Edge-to-Edge (PWE3) Architecture," Request for Comments: 3985, Network Working Group (Bryant and Pate, ed.), March, 2005, which is incorporated by reference as if fully set forth herein.

PEs 16 may provide one or more services, such as virtual private network 13, to transparently interconnect CEs 18 to one another. To continue the above example, the large entity may own and operate each of customer networks 14 and purchase from the service provider a VPLS or layer 2 circuit to transparently interconnect each of these CEs 18 to one another via service provider network 12. In this case, PE 16A may emulate a direct connection in accordance with the virtual private network 13 to CEs 18A such that CE 18A may operate as if directly connected to CE 18B. Likewise, PE 16B and PE 16C may each emulate a direct connection in accordance with the virtual private network 13 to CE 18B such that CE 18B may operate as if directly connected to CE 18A. In some instances, one or more of CEs 18 may comprise or otherwise operate as a L2 bridge between associated customer networks 14 and connected PEs 16. In such instances, the VPN 13 "learns" multiple source L2 addresses of additional devices within the customer networks 14 from the bridging CEs 18. The techniques described herein may apply with respect to these multiple source L2 addresses in addition to, or instead of, to the learned source L2 addresses of CEs 18.

PEs 16 emulate L2 connectivity by transporting L2 PDUs using service links 22A-22B that couple PE 16A to PEs 16B, 16C, respectively over service provider network 12. The L2 PDUs may transport multicast traffic. For a VPLS-style VPN 13, service links 22 may provide "full mesh" in that a VPLS provides logical point-to-point connectivity between each of a set of CEs 18 and associated customer networks 14. Service links 22 are illustrated in FIGS. 1-2 as dashed lines to reflect that these may not directly couple PEs 16 to one another with a single physical link, but may transport PDUs over one or more physical links and intermediate network devices that form each of service links 22. Service links 22 may be bi-directional or unidirectional to suit any particular form of interconnection. Each of service links 22 may be implemented as a pseudowire.

Each of service links 22 may operate over a packet-switched network (PSN) tunnel that connects respective service link endpoint PEs 16. For example, customer L2 traffic encapsulated for transport along service link 22A in service packets may be further encapsulated for transport in a transport tunnel established between PEs 16A, 16B. While generally described in this document as an LSP, transport tunnels may also include GRE, L2TP, and IPsec tunnels, for example. A particular PSN tunnel may deliver service packets for multiple service links for different VPN instances, including any of service links 22.

An administrator of service provider network 12 may configure and/or PEs 16 may cooperatively establish service links 22 for the VPLS instance, and once established, PEs 16 begin emulating the direct connection between customer networks 14 using service links 22, thus implementing an emulated service that terminates at the customer edges. Each of PEs 16 for each of the service links 22 endpoints is configured with the particular pseudowire label that identifies received service packets for the VPLS instance in the data plane, as well as with the particular pseudowire label that the PE is to attach to service traffic to specify the service traffic for the VPN 13 instance to the data plane of the receiving PE. For example, PE 16A may be configured to attach pseudowire label "100" to specify service link 22A traffic over a PSN tunnel to PE 16B. PE 16A may be further configured with pseudowire label "200" that, when attached to service packets received in a PSN tunnel from PE 16B, identifies the traffic as service link 22A traffic.

CEs 18 forward L2 traffic via ACs 20, 23 to corresponding PEs 16, which attach the appropriate pseudowire label to the L2 traffic to generate service packets and forward the service packets through service provider network 12 via selected ones of service links 22 in accordance with learned L2 bridging information for the VPN 13. Receiving PEs 16 identify the VPN 13 using the attached pseudowire labels and, in accordance with learned L2 bridging information for VPN 13, transparently deliver the L2 traffic via ACs 20, 23 to the other one of customer networks 14. In this manner, a large entity may use VPN 13 of service provider network 12 to interconnect disparate and often geographically separate customer networks 14. In some instances, network system 10 may include additional customer networks 14 and corresponding CEs 18 for which service provider network 12 provides one or more VPN instances to interconnect the CEs 18 in various combinations.

In some instances, service provider network 12 implements a hierarchical VPLS, or H-VPLS, to eliminate the requirement of a full mesh of service links to connect each pair of PEs 16. In these instances, a particular pseudowire may carry PDUs switched by any number of PE routers. Again in such instances, CEs 18A-18B may represent multi-tenant units (MTUs) to serve one or more customers in, for example, multi-tenant buildings or a data center. Customer networks 14 associated with the tenants connect to associated serving MTUs (represented by CEs 18) via one of attachment circuits 20, 23. MTUs thus offer functionality similar to that provided by PEs 16 and CEs 18, in that the MTUs receive L2 PDUs via attachment circuits and intelligently switch the L2 PDU toward remote customer networks in accordance with a hierarchical VPLS here represented as VPN 13.

Network management system 8 communicates with PEs 16 via network system 10 to manage and oversee PEs 16 using a device management protocol. One example device protocol is the Simple Network Management Protocol (SNMP) that allows network management system 8 to traverse and modify management information bases (MIBs) that may store configuration and performance data within each of PEs 16.

Redundant attachment circuit 23B is a backup connection between multi-homing PEs 16B, 16C (in particular PE 16C) and CE 18B. Redundant attachment circuit 23B may improve reliability by providing graceful recovery of a failure of attachment circuit 23A. CE 18B may be configured with the redundant attachments circuits 23 configuration such that attachment circuit 23A is a single active attachment circuit (e.g., active pseudowire). For example, PE 16A may receive such configuration data from a network management system, or from an administrator/operator using a management interface for CE 18B, such as a graphical user interface or command-line interface. CE 18B is configured with configuration data specifying PE 16B as the primary neighbor, which is therefore given preference by CE 18B and CE 18B uses attachment circuit 23A with PE 16B for customer traffic. For the label distribution protocol (LDP) signaling, PE 16B and CE 18B exchange labels for both incoming and outgoing traffic. In some instances, for backup attachment circuit 23B, CE 18B accepts the LDP label advertisement from the backup neighbor PE 16C, but CE 18B does not send a label advertisement to PE 16C, which leaves the attachment circuit 23B in an incomplete state. In such instances, the attachment circuit 23B with backup neighbor PE 16C by CE 18B with the label advertisement to PE 16C is completed only when the primary neighbor fails. However, CE 18B may use the label advertisement from PE 16C to send traffic via attachment circuit 23B to PE 16C. CE 18B may determine whether to switch from primary attachment circuit 23A to backup attachment circuit 23B.

PE 16A may be configured with configuration data indicating PE 16B and 16C are primary and backup neighbors for the CE 18B connection for VPN 13. For example, PE 16A may receive such configuration data from NMS 8, or from an administrator/operator using a management interface for PE 16A such as a graphical user interface or command-line interface. PE 16A may therefore replicate L2 PDUs to both PE 16B and 16C to enable graceful switchover. That is, at least in some examples, PE 16A does not have information designating which of PEs 16B and 16C is the primary neighbor, at any time, and therefore forwards PDU traffic from CE 18A for VPN 13 to both PEs 16B and 16C via respective service links 22A and 22B, to enable the redundancy and graceful switchover.

Host 19 outputs a multicast join message 24 to request to receive multicast traffic 17 for a multicast group for which multicast server 11 outputs the multicast traffic 17. Multicast join message 24 includes a multicast address that specifies the multicast group. Multicast join message 24 may represent an Internet Group Management Protocol (IGMP) Report message. The IGMP may be IGMPv1, IGMPv2, or IGMPv3, for example. Network system 10 including PEs 16 implementing VPN 13 forward the multicast join message 24 to the multicast router for the L2 network that includes host 19, which in the example of FIGS. 1-2 is reachable via a path that includes PEs 16 implementing VPN 13. Any of router 7, PE 16A, and CE 18A may represent the multicast router for host 19. However, the multicast router for host 19 is part of a remote customer network reachable via VPN 13. Thus, neither PE 16B nor PE 16C is the multicast router for host 19. The multicast router may be referred to as the IGMP router. Multicast join message 24 may be unsolicited or in response to a general query for interested receivers for the multicast group.

To reduce an amount of multicast traffic in service provider network 13, PEs 16, operating as L2 switches for VPN 13 and customer networks 14, snoop multicast join and leave messages to identify interested and no longer interested receivers for a multicast group and forward associated multicast traffic for the multicast group accordingly. Snooping by L2 switching devices of multicast join and leave messages may be referred to as IGMP snooping.

In the example of FIGS. 1-2, PE 16B snoops multicast join message 24 issued by host 19. PE 16B processes the multicast join message 24 to determine that attachment circuit 23A includes interested receivers for the multicast group. PE 16B therefore generates multicast state 26A to cause PE 16B to forward multicast traffic 17, received on service link 22A for VPN 13, on attachment circuit 23A. PE 16A also snoops multicast join message 24 forwarded from PE 16B. PE 16A therefore replicates outputs multicast traffic 17 to primary PE 16B for multi-homed customer network 14B via service link 22A and also to backup PE 16C for multi-homed customer network 14B via service link 22B.

However, because PE 16C is a backup neighbor for the multi-homed customer network 14B, PE 16C does not forward multicast traffic 17 received via service link 22B to customer network 14B via backup attachment circuit 23B. In other words, PE 16C blocks L2 PDUs for VPN 13 received via service link 22B from forwarding on attachment circuit 23B.

For a single active attachment circuit configuration for redundancy, as in the example of network system 10, CE 18B only forwards the multicast join message 24 to the active neighbor PE 16B and not to the backup neighbor PE 16C. PE 16C therefore is unable to snoop the multicast join message 24 and to create multicast state, based on the multicast join message 24, to cause PE 16C to forward multicast traffic 17, received on service link 22B for VPN, on attachment circuit 23B in the event that switchover to the backup attachment circuit 23B and backup neighbor 16C occurs, and the backup neighbor 16C completes the attachment circuit 23B and assumes the role of primary neighbor for the multi-homed customer network 14B. After switchover, host 19 outputs a new multicast join message 24 per the multicast refresh operation (e.g. IGMP Report refresh), whereby host 19 periodically refreshes its membership in the multicast group. However, because the time of the new multicast join message 24 is subsequent to the time of the switchover, any multicast traffic 17 received by PE 16C during the intervening period is not forwarded via attachment circuit 23B and therefore is not received by the host 19.

In accordance with techniques described in this disclosure, CE 18B snoops multicast join message 24 issued by host 19 of customer network 14B. In response to determining from the multicast join message 24 that host 19 is seeking to join a multicast group to receive multicast traffic from a multicast source, the CE 18B generates and sends a control plane message 25 on the backup attachment circuit 23B to the backup neighbor PE 16C. The control plane message 25 includes an indication of the multicast group and is destined for the PE 16C. For example, control plane message 25 may include an IP header having an IP destination address that is an IP address of PE 16C. As described in further detail below, the control plane message 25 may not be an IGMP message. Rather, the control plane message 25 may be an LDP signaling message that includes the indication of the multicast group.

The backup PE 16B receives the control plane message 25 and responsively generates and stores multicast forwarding state 26B for the multicast group, where the multicast forwarding state 26B directs PE 16B to forward received multicast traffic 17 for the multicast group when the PE 16B assumes the role of primary neighbor for multi-homed customer network 14B and completes or unblocks the attachment circuit 23B.

In the event of failure of the primary attachment circuit 23A, as shown in FIG. 1, the backup PE 16B assumes the role of primary neighbor PE 16C for multi-homed customer network 14B, as shown in FIG. 2, and uses the previously stored multicast forwarding state 26B to rapidly switchover to begin forwarding multicast traffic 17 for the multicast group via the attachment circuit 23B (now the primary attachment circuit) to the CE 18B for forwarding to the host 19.

The techniques of this disclosure may provide one or more advantages. For example, by proactively providing the backup PE 16C with an indication of interested recipients for the multicast group reachable via attachment circuit 23B using explicit control plane messaging between CE 18B and PE 16C, the CE 18B and backup PE 16C may provide more rapid assumption of multicast traffic 17 forwarding from the PE 16C to the CE 18B in the event of failure of the primary attachment circuit 23A. As a result, the blackholing of host 19 that would otherwise occur with respect to multicast traffic 17 while awaiting multicast refresh may be reduced in time, for PE 16C may begin forwarding multicast traffic 17 using multicast state 26B without waiting for a new multicast join message 24. Moreover, the explicit control plane messaging techniques may provide advantages over an alternative in which the CE 18B sends redundant multicast join messages 24 to the backup PE 16C via the backup attachment circuit 23B. For example, generating and sending an explicit control plane message 25 by the CE 18 may reduce subsequent redundant multicast signaling traffic from the CE 18B to the backup PE 16C. As another example, because the backup PE 16C receives an explicit control plane message 25, PE 16C may avoid unnecessarily snooping for IGMP traffic in the data plane.

Figure 3:
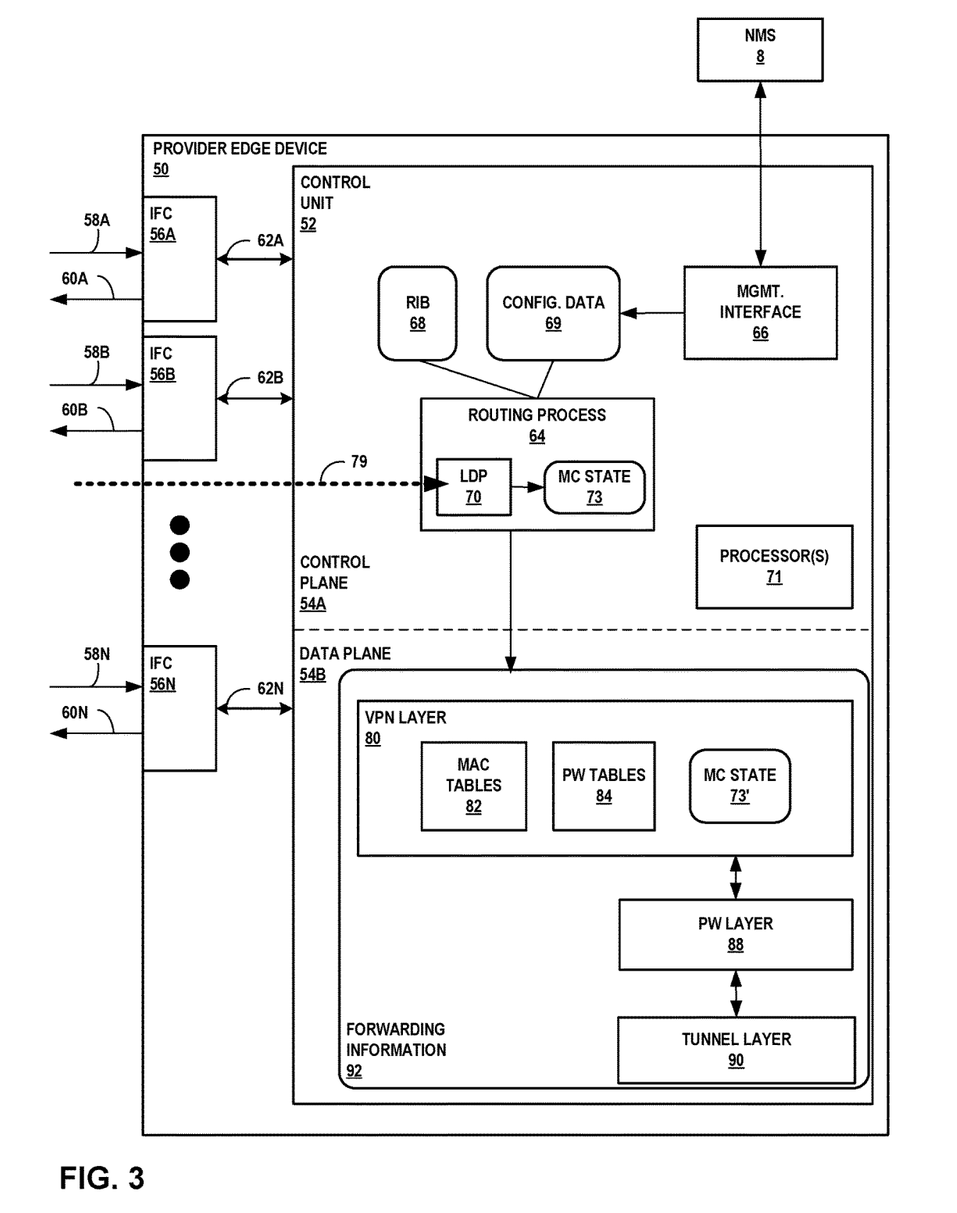
FIG. 3 is a block diagram illustrating an example provider edge device, according to techniques described in this disclosure.

FIG. 3 is a block diagram illustrating example provider edge device 50 ("PE 50"), according to techniques described in this disclosure. For purposes of illustration, PE 50 may be described below within the context of an exemplary network system 10 of FIGS. 1-2 and, in particular, may represent PE 16B. Moreover, while described with respect to a particular network device, e.g., a router, the techniques may be implemented by any network device that may operate as a provider edge device for a layer 3 network.

PE 50 includes a control unit 52 and one or more interface cards 56A-56N ("IFCs 56") coupled to control unit 52 via internal links 62A-62N. Control unit 52 may comprise one or more hardware processors 71 that includes processing circuitry to execute software instructions, such as those used to define a software or computer program, stored to a computer-readable storage medium (not shown in FIG. 3), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 52 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 52 is divided into two logical or physical "planes" to include a first control or routing plane 54A and a second data or forwarding plane 54B. That is, control unit 52 implements two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 54A of control unit 52 executes the routing and control functionality of PE 50. In this respect, control plane 54A represents hardware or a combination of hardware and software of control unit 52 that implements routing protocols (not shown in FIG. 3) by which routing information stored in routing information base 68 ("RIB 68") may be determined. RIB 68 may include information defining a topology of a network, such as service provider network 12.

Routing process 64 of control plane 54A may resolve the topology defined by routing information in RIB 68 to select or determine one or more routes through the network. Routing process 64 may then update data plane 54B with a representation of these routes, where data plane 54B stores these routes as forwarding information 92, which may represent a forwarding information base.

Forwarding or data plane 54B represents hardware or a combination of hardware and software of control unit 52 that forwards network traffic in accordance with forwarding information 92. Data plane 54B provides forwarding of network traffic received by interface cards 56 via inbound links 58A-58N. VPLS layer 80, pseudowire layer 88 (illustrated as "PW layer 88"), and tunnel layer 90 of data plane 54B process and forward received network traffic associated with L2VPN instances in which PE 50 participates in accordance with forwarding information 92, MAC tables 82, and PW tables 84. Although described as a pseudowire layer, pseudowire layer 88 may implement other forms of service links described in this disclosure. Each of VPN layer 80, PW layer 88, and tunnel layer 90 represents components of data plane 54B to implement the respective functionality of the layer. For example, VPN layer 80 represents hardware or a combination of hardware and software to implement L2 switching and other VPN-related functionality for VPN instances in which PE 50 participates, such as VPN 13 of FIGS. 1-2.

Tunnel layer 90 provides tunneling services to deliver one or more pseudowires over a packet-switched network to additional routers participating in VPN instances. A single tunnel may carry one or more pseudowires. Routing process 64 of control plane 54A may perform setup, maintenance, and tear-down signaling for tunnels underlying pseudowires of the VPNs. Tunnels implemented by tunnel layer 90 may include LSPs as well as GRE, L2TP, and IPsec tunnels. Tunnel layer 90 receives outbound pseudowire traffic and a specified tunnel identifier from pseudowire layer 88 and outputs the traffic in accordance with the specified tunnel. Tunnel layer 90 delivers pseudowire packets received via a tunnel to PW layer 88.

Pseudowire layer 88 selects VPN instances to process received pseudowire packets based on the respective pseudowire label of the packet. That is, upon receiving a pseudowire-labeled packet from tunnel layer 90, PW layer 88 strips the pseudowire label from the PDU and selects the VPN instance associated with the pseudowire identified by the label. In other words, the PW layer 88 uses the attached pseudowire label to demultiplex the PDU for handling by VPN layer 80 according to the appropriate VPN instance. Pseudowire layer 88 additionally receives outbound PDUs and pseudowire identities from VPN layer 80, maps the pseudowire identities to outbound pseudowire labels for the pseudowires, attaches the outbound pseudowire labels to the PDUs, and sends the pseudowire traffic to tunnel layer 90 for output in packet-switched network tunnels that carry the pseudowire.

VPN layer 80 of data plane 54B implements one or more VPN instances in which PE 50 participates by operating as a virtual switch or virtual bridge to interconnect multiple customer networks over a provider network, or to connect spokes and hub links of an H-VPLS instance. VPN layer 80 performs L2 learning. That is, VPN layer 80 "learns" customer device L2 addresses (hereinafter, "MAC addresses") for a VPN from inbound PWs and inbound attachment circuit interfaces and associates those customer MAC addresses with corresponding outbound PWs and outbound attachment circuit interfaces for a VPN. For each VPN, VPN layer 80 includes a respective one of PW tables 84 that stores pseudowire identifies for the VPN as well as a respective one of MAC tables 82 that maps learned L2 addresses to outbound interfaces of IFCs 56, to pseudowire identities included in the respective PW table for the VPN, or to pseudowire identities that represent a spoke for an H-VPLS instance.

Control plane 54A includes management interface 66 (illustrated as "mgmt. interface 66") by which network management system 8 (illustrated as "NMS 8"), or in some instances an administrator using a command line or graphical user interface, sets configuration data 69 to define operations of PE 50 and, more particular, of routing process 64. Management interface 66 may represent a process executed by processor(s) 71. Configuration data 69 set using management interface 66 may specify an L2VPN to interconnect customer networks into a single Ethernet domain using service links (e.g., pseudowires). For example, network management system 8 may configure PE 50 as a participant in a particular VPN instance, such as VPN 13 of FIGS. 1-2. Routing process 64 may perform auto-discovery or other techniques to determine additional PE routers or MTUs participating in the VPN 13 and additionally perform signaling to establish a pseudowires between PE 50 and each of the additional PE routers (such as PE 16A of FIGS. 1-2). In the case of an H-VPLS instance, routing process 64 may perform signaling to establish one or more spokes and/or one or more hub links with one or more other MTUs and/or routers. Routing process 64 may execute Label Distribution Protocol (LDP)-based and/or Border Gateway Protocol (BGP)-based techniques to perform the auto-discovery and signaling.

Configuration data 69 may specify PE 50 as a backup neighbor PE for a multi-homed customer network. Configuration data 69 may define an attachment circuit for the multi-homed customer network, and routing process 64 may create a virtual interface for the attachment circuit to send and receive L2 PDUs via the attachment circuit. The L2 PDUs may transport multicast traffic.

In accordance with techniques of this disclosure, interface cards 56 detect control plane message 79. Because control plane message 79 is destined for a network address of PE 50, data plane 54B causes PE device 50 to store the control plane message 79 to host memory, together with an indication of a virtual interface of PE 50 for the attachment circuit via which PE 50 received control plane message 79. The attachment circuit is associated with a L2VPN configured in configuration data 69. For example, the attachment circuit may be attachment circuit 23B associated with VPN 13 of FIGS. 1-2. Routing process 64 obtains the control plane message 79 and the indication from the host memory for processing. The control plane message 79 may be a LDP message, in which case routing process 64 executes LDP protocol 70, extended according to techniques herein to enable interpretation of control plane message 79, to process the control plane message 79. Control plane message 79 may represent an example instance of control plane message 25 of FIGS. 1-2.

Control plane message 79 includes a list of one or more multicast addresses for respective multicast groups for which PE 50 is to forward, for the L2VPN and via the corresponding attachment circuit via which PE 50 received control plane message 79, associated multicast traffic. Routing process 64 extracts the one or more multicast addresses and generates multicast state 73 based on the one or more multicast addresses. Routing process 64 generates forwarding information from the multicast state 73 and pushes the generated forwarding information to data plane 54B as multicast state 73'. Multicast state 73' maps each of the one or more multicast addresses to the virtual interface for the attachment circuit for the L2VPN.

Routing process 64 may also receive, via the attachment circuit, an indication that PE 50 is to assume the active neighbor role for the multi-homed customer network. The indication may be included in the control plane message 79 or in a separate message from the multi-homed customer network to PE 50. For example, the control plane message 79 may be an LDP label mapping message to complete the attachment circuit and enable PE 50 to map forwarding equivalence class (FEC) traffic to the label included in the LDP mapping message and output FEC traffic labeled with the label via the attachment circuit.

As a result of the indication that PE 50 is to assume the active neighbor role, routing process 64 may unblock or complete the attachment circuit such that PE 50 begins forwarding unicast and multicast traffic for the VPN, via the attachment circuit, to the multi-homed customer network.

Interface cards 56 receive multicast traffic for the one or more multicast addresses. One or more hardware processors that implement data plane 56B (hereinafter, data plane 56B) apply forwarding information 92 including multicast state 73' to map the multicast addresses indicated by the multicast traffic to the virtual interface for the attachment circuit. If the multicast state 73' indicates a multicast address for a multicast packet, e.g., data plane 56B therefore forwards the multicast packet to the multi-homed customer network via the attachment circuit. Data plane 56B delivers the multicast packet to one of interface cards 56, which transmits the multicast packet via one of outbound links 60.

Figure 4:
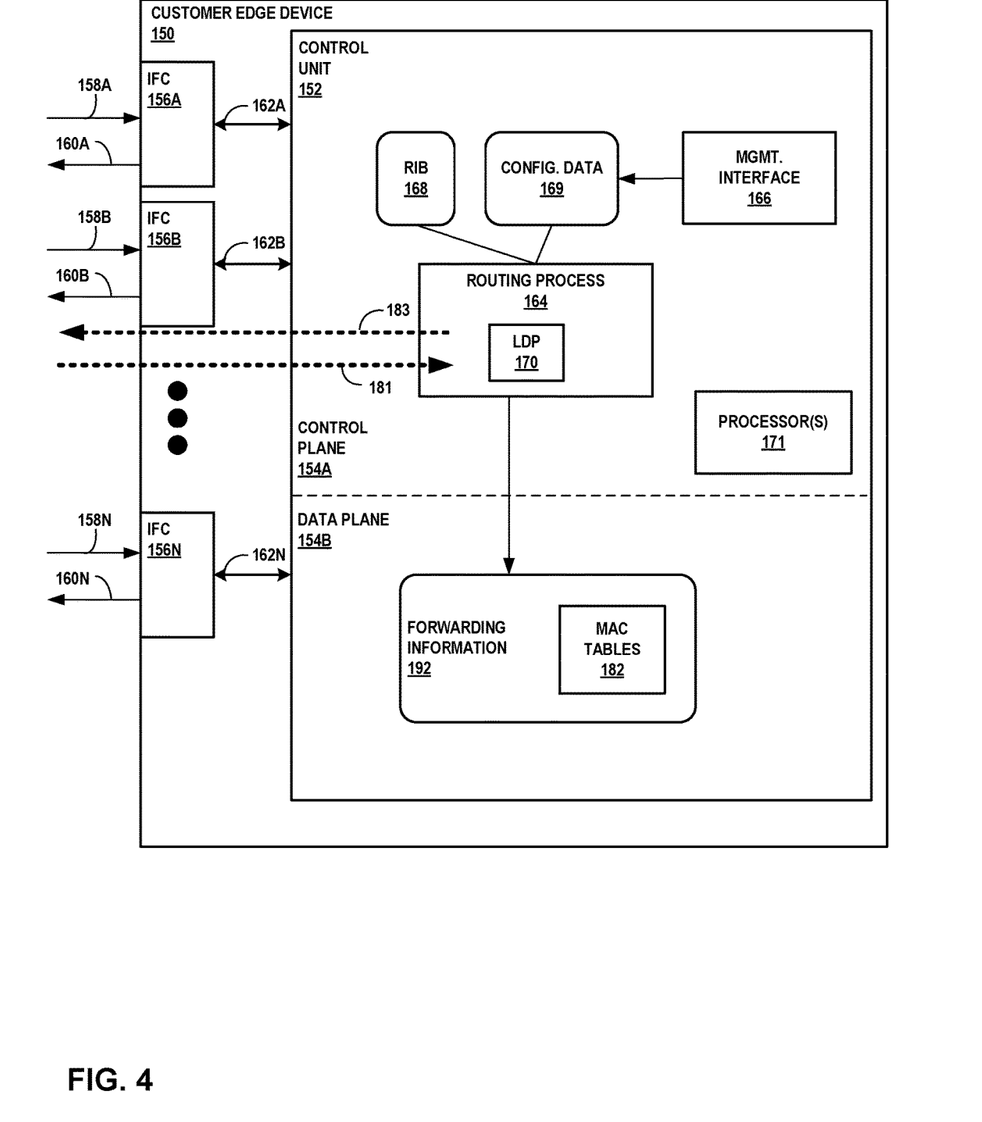
FIG. 4 is a block diagram illustrating example customer edge device, according to techniques described in this disclosure.

FIG. 4 is a block diagram illustrating example customer edge device 150 ("CE 150"), according to techniques described in this disclosure. For purposes of illustration, CE 150 may be described below within the context of an exemplary network system 10 of FIGS. 1-2 and, in particular, may represent CE 18B. Moreover, while described with respect to a particular network device, e.g., a router, the techniques may be implemented by any network device that may operate as a customer edge device for a customer network.

PE 150 includes a control unit 152 and one or more interface cards 156A-156N ("IFCs 156") coupled to control unit 152 via internal links 162A-162N. Control unit 152 may comprise one or more hardware processors 171 that includes processing circuitry to execute software instructions, such as those used to define a software or computer program, stored to a computer-readable storage medium (not shown in FIG. 4), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 52 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 152 is divided into two logical or physical "planes" to include a first control or routing plane 154A and a second data or forwarding plane 154B. That is, control unit 152 implements two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 154A of control unit 152 executes the routing and control functionality of CE 150. In this respect, control plane 154A represents hardware or a combination of hardware and software of control unit 152 that implements routing protocols (not shown in FIG. 4) by which routing information stored in routing information base 168 ("RIB 168") may be determined. RIB 168 may include information defining a topology of a network, such as customer network 14B. Routing process 164 of control plane 154A may resolve the topology defined by routing information in RIB 168 to select or determine one or more routes through the network. Routing process 164 may then update data plane 154B with a representation of these routes, where data plane 154B stores these routes as forwarding information 192, which may represent a forwarding information base.

Forwarding or data plane 154B represents hardware or a combination of hardware and software of control unit 152 that forwards network traffic in accordance with forwarding information 192. Data plane 154B provides forwarding of network traffic received by interface cards 156 via inbound links 158A-158N. Data plane 154B processes and forwards received network traffic in accordance with forwarding information 192. Data plane 154B includes MAC tables 182 that learns MAC address-interface bindings for L2 switching.

Control plane 154A includes management interface 166 (illustrated as "mgmt. interface 166") by which a network management system (not shown in FIG. 4), or in some instances an administrator using a command line or graphical user interface, sets configuration data 169 to define operations of CE 150 and, more particular, of routing process 164. Management interface 166 may represent a process executed by processor(s) 171. Configuration data 169 set using management interface 166 may specify that CE 150 is to be multi-homed to a VPN with redundant attachment circuits configured for CE 150. The configuration data 169 may specify that a PE reachable via one of the attachment circuits is a primary PE and a PE reachable by another one of the attachment circuits is a backup PE.

Configuration data 169 may define attachment circuits for multi-homing for the VPN with the primary and backup PEs, and routing process 164 may create a virtual interface for the attachment circuit to send and receive L2 PDUs via the attachment circuit. The L2 PDUs may transport multicast traffic. Routing process 164 may perform auto-discovery and signaling to establish the attachment circuits between CE 150 and the multi-homing PE routers (such as PEs 16B, 16C of FIGS. 1-2). In the case of an H-VPLS instance, routing process 164 may perform signaling to establish one or more spokes and/or one or more hub links with one or more other MTUs and/or routers. Routing process 164 may execute Label Distribution Protocol (LDP)-based and/or Border Gateway Protocol (BGP)-based techniques to perform the auto-discovery and signaling.

Interface cards 156 detect a multicast join message 181 that specifies a multicast address for a multicast group. Multicast join message 181 may represent an example of multicast join message 24 of FIGS. 1-2. Multicast join message 181 is not destined for a network address of CE 150, but data plane 154B perform multicast (e.g., IGMP)

snooping to causes CE device 150 to store the multicast join message 181 to host memory. Data plane 154B also applies forwarding information 192 to multicast join message 181 to determine a destination for multicast join message 181 is reachable via an attachment circuit for the VPN. Data plane 154B therefore applies appropriate encapsulation (e.g., PW label and tunnel encapsulation) for the active attachment circuit (e.g., attachment circuit 23A) and delivers the encapsulated multicast join message 181 to one of interface cards 156, which transmits the encapsulated multicast join message 181 via the primary attachment circuit via one of outbound links 160 toward the primary multi-homing PE.

Routing process 164 also processes multicast join message 181 to obtain the multicast address specified therein. Routing process 164 may execute a multicast protocol such as IGMP to interpret multicast join message 181 to obtain the multicast address. Routing process 164 may generate multicast state to cause the CE device 150 to forward multicast traffic with the multicast address on the customer network for receipt by a host that issued the multicast join request.

In accordance with the described techniques, routing process 164 generates a control plane message 183 to publicize the multicast address to the backup multi-homing PE for the VPN. Control plane message 183 may represent an example instance of control plane message 25 of FIGS. 1-2 and an example instance of control plane message 79 of FIG. 3.

Control plane message 183 is destined for the backup multi-homing PE for the VPN. Data plane 154B therefore applies appropriate encapsulation (e.g., PW label and tunnel encapsulation) for the backup attachment circuit (e.g., attachment circuit 23B) and delivers the encapsulated control plane message 183 to one of interface cards 156, which transmits the encapsulated control plane message 183 via the backup attachment circuit via one of outbound links 160 toward the backup multi-homing PE.

Figure 5:
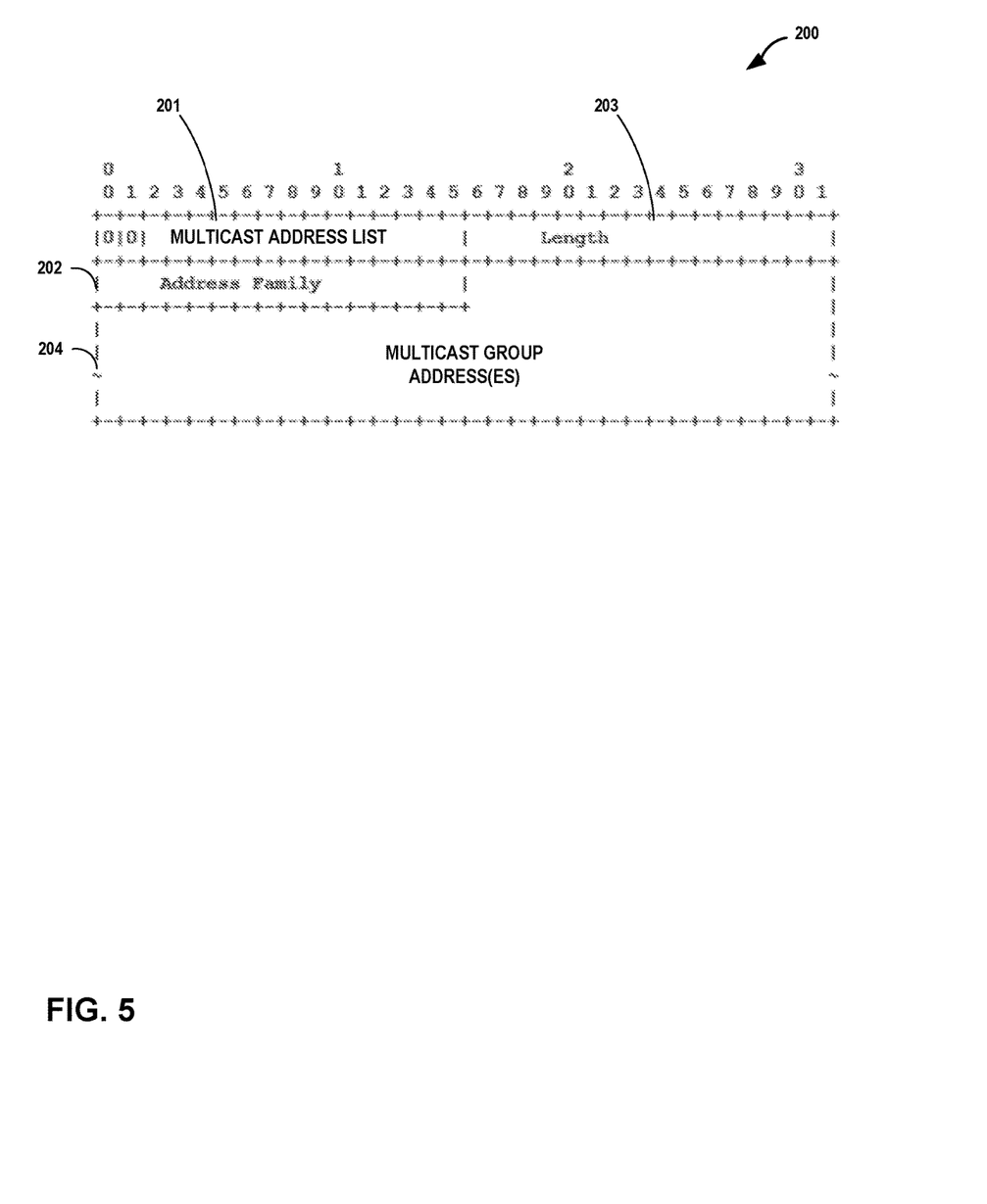
FIG. 5 is a block diagram illustrating a multicast list data structure, according to techniques described herein.

FIG. 5 is a block diagram illustrating a multicast list data structure, according to techniques described herein. Multicast list 200 is a data structure that includes a list of one or more multicast addresses 204 for multicast groups. Multicast list 200 includes a type field 201 indicating that multicast list includes a list of multicast addresses, an address family field 202 indicating the address family (e.g., IPv4 or IPv6) of the multicast addresses, where the address families are specified by the Internet Assigned Numbers Authority; a length field 203 indicating a number length of the multicast list 200 in octets; and a list of one or more multicast address 204. Multicast list 200 may be encoded as an LDP Type-Length-Value message, wherein the value is the list of one or more multicast address 204.

CE 18B may send, via backup attachment circuit 23B, a control plane message 25 to PE 16C that includes multicast list 200 to cause PE 16C to generate and store multicast state 26B for distributing multicast traffic associated with the one or more multicast address 204 to CE 18B. PE 16C processes the control plane message 25 including multicast list 200 to extract the one or more multicast address from field 204 and generate and store the multicast state 26B. Multicast list 200 may be included in a Label Distribution Protocol Label Mapping message (extended according to techniques of this disclosure) sent by CE 18B to PE 16C to advertise FEC-label bindings for attachment circuit 23B to PE 16C. Additional details regarding LDP are found in L. Andersson, Ed., "LDP Specification," Internet Engineering Task Force Network Working Group, October 2007, which is incorporated by reference herein in its entirety (hereinafter, "LDP Specification"). In some cases, multicast list 200 or other indication of one or more multicast groups may be included in a Border Gateway Protocol message, such as a BGP UPDATE message. For example, multicast list 200 may be included as a PATH attribute or an MP_REACH_NRLI included in an BGP UPDATE message that is control plane message 25.

In some examples, control plane message 25 may include an LDP Label Mapping message may be extended from "LDP Specification" to include multicast list 200 as an Optional Parameter. In some examples, control plane message 25 may include an LDP Address Message, per the LDP Specification, that includes multicast list 200 in lieu of Address List TLV. In such cases, multicast list 200 may be a Multicast Address List TLV. In some examples, control plane message 25 may include an LDP Multicast Address Message that is similar to an LDP Address Message but has a different type and also includes multicast list 200 instead of an Address List TLV. In response to receiving a multicast leave message (e.g., an IGMP Report indicating host 19 no longer desires to receive multicast traffic for a multicast group), CE 18B may send an additional control plane message withdrawing the multicast address for the multicast group. The additional control plane message may be a LDP Multicast Address Withdraw Message that includes a list of one or more multicast addresses, including the multicast address for the multicast group.

Based on the type field 201 or other indication within a control plane message 25 that includes multicast list 200, PE 16C processes the multicast list 200 to extract the one or more multicast address from field 204 and generate and store the multicast state 26B, as described herein.

Figure 6:
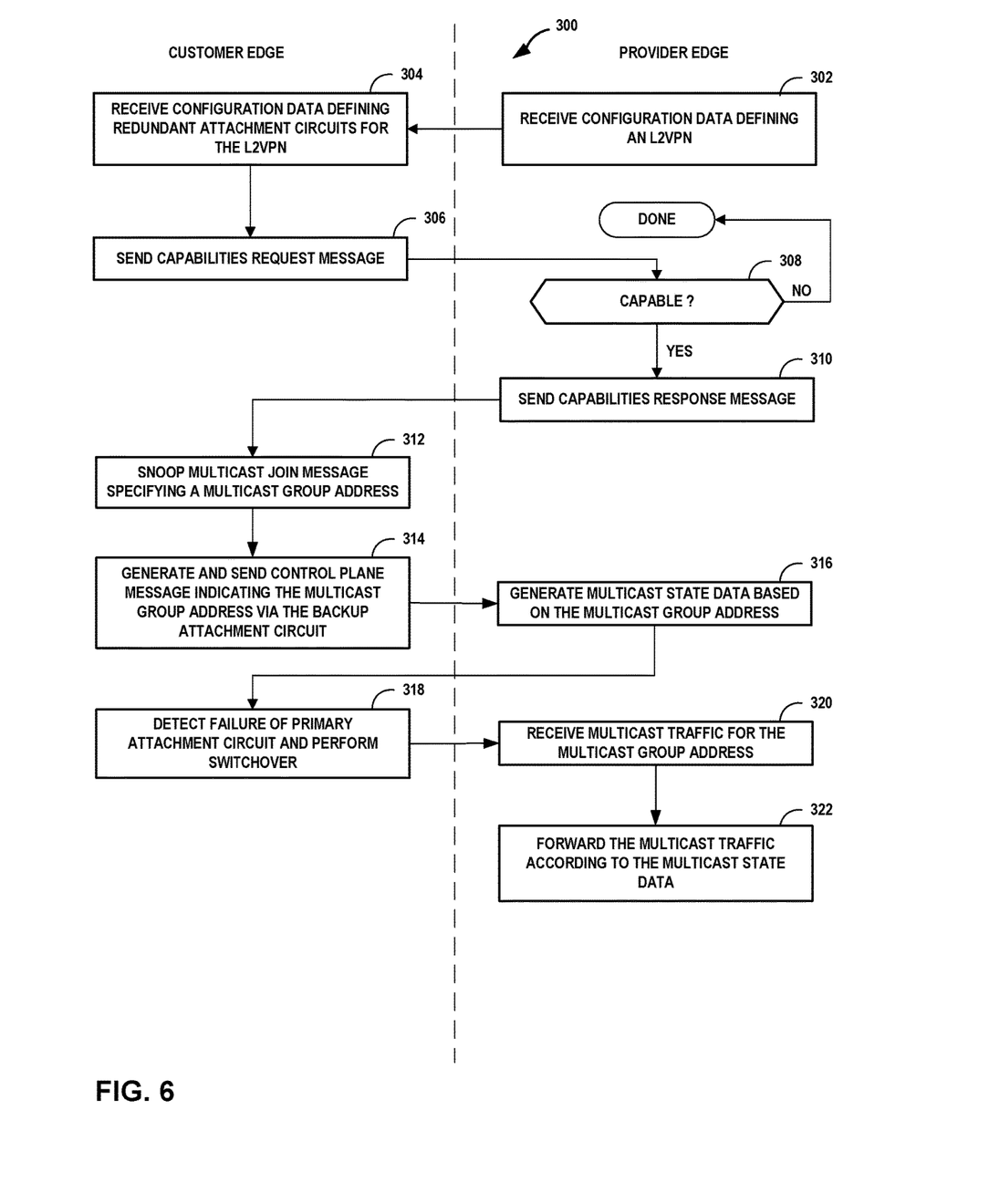
FIG. 6 is a flowchart an illustrating example mode of operation for a network system, according to techniques described herein.

FIG. 6 is a flowchart an illustrating example mode of operation for a network system, according to techniques described herein. Mode of operation 300 is described with respect to network system 10 including customer edge device 18B ("Customer Edge") and provider edge device 16C ("Provider Edge") of FIGS. 1-2. PE 16C receives configuration data defining L2VPN 13 (302) from an administrator or agent, such as a network management system. CE 18B also receives configuration data defining redundant attachment circuits 23A-23B to a primary neighbor PE 16B and a backup neighbor 16C, respectively (304). CE 18B may receive configuration data from an administrator or agent, such as a network management system, which may be different than the administrative entity that provides configuration data to PE 16C. CE 18B, in response to receiving the configuration data at 304, may send via attachment circuit 23B a capabilities request message that requests an indication of whether backup neighbor PE 16C has a capability for processing a control plane message that includes a list of multicast addresses, such as control plane message 25 (306). If PE 16C does not have the capability (NO branch of 308), mode of operation 300 concludes. If PE 16C has the capability (YES branch of 308), PE 18B sends via attachment circuit 23B a capabilities response message that includes an indication that PE 16C has the capability (310). The capabilities request and response messages may be LDP messages, such as LDP Notification Messages. For example, the LDP Notification messages may be LDP Hello messages having an optional parameter to indicate a capability request and capability response, respectively.

CE 18B snoops an IGMP Report or other multicast join message 24 that specifies a multicast address associated with a multicast group and indicates that an issuer of the multicast join message 24 is an interested receiver for the multicast group (312). CE 18B responsively generates and sends control plane message 25, which specifies the multicast address, to PE 16C via backup attachment circuit 23B (314). If customer network 14B has at least one interested receiver for multiple multicast groups, CE 18B may generate and send the control plane message 25 including respective multicast addresses for each of the multicast groups. PE 16C receives the control plane message 25 and responsively generates, based on the multicast group specified in control plane message 25, multicast state data 26B usable for forwarding, via the attachment circuit 23B to CE 18B, multicast traffic associated with the multicast group (316).

CE 18B subsequently detects a failure of primary attachment circuit 23A, for example due to a failure of the communication link and/or network coupling CE 18B to PE 16B or to a failure of the active neighbor PE 16B, and performs a switchover to cause PE 16C to assume the role of active neighbor for multi-homed CE 18B (318). As the active neighbor for multi-homed CE 18B, PE 16C unblocks or otherwise begin forwarding L2 traffic (including multicast traffic) received from network 12 for VPN 13 via attachment circuit 23B to CE 18B. PE 16C receives multicast traffic on VPN 13 and associated with the multicast address, e.g. on service link 22B from PE 16A (320), and PE 16C forwards the multicast traffic via attachment circuit 23B to CE 18B according to the multicast state data 26B (322). For example, PE 16C applies multicast state data 26B to the multicast traffic and forwards the multicast traffic using an interface configured in PE 16C for attachment circuit 23B.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
    receiving, by a provider edge device of a layer 3 (L3) network, configuration data for a layer 2 (L2) virtual private network (L2VPN) for the L3 network for switching L2 packet data units (PDUs) among two or more L2 networks connected to the L3 network, wherein the configuration data configures the provider edge device as a neighbor having a redundant attachment circuit, for the L2VPN, with a customer edge device of a local L2 network of the two or more L2 networks;
    receiving, by the provider edge device from the customer edge device via the redundant attachment circuit, when the provider edge device is a backup neighbor for the customer edge device, a control plane message destined for the provider edge device, the control plane message indicating a multicast group; and
    forwarding, by the provider edge device to the customer edge device via the redundant attachment circuit for the L2VPN and based at least on the control plane message, multicast traffic for the multicast group received from the L3 network.

2. The method of claim 1, wherein the control plane message comprises one of a Label Distribution Protocol message and a Border Gateway Protocol message.

3. The method of claim 1, wherein the control plane message comprises a Label Distribution Protocol label mapping message specifying forwarding equivalence class traffic and a label that are usable by the provider edge device for mapping L2 PDUs, received for the L2VPN, matching the forwarding equivalence class traffic to the label and generating labeled L2 PDUs for forwarding to the customer edge device.

4. The method of claim 1, wherein the control plane message comprises a Label Distribution Protocol address message having a multicast address list type-length-value that specifies the multicast address of the multicast group.

5. The method of claim 1, wherein the receiving comprises:
    receiving, by the provider edge device, the control plane message prior to snooping, by the provider edge device, a multicast join message received via the redundant attachment circuit from the customer edge device and indicating the multicast group.

6. The method of claim 1, further comprising:
    generating, by the provider edge device based at least on the control plane message, multicast state data,
    wherein the forwarding comprises forwarding, by the provider edge device to the customer edge device via the redundant attachment circuit and based at least on the multicast state data, the multicast traffic for the multicast group received on the L2VPN.

7. The method of claim 1, further comprising:
    receiving, by the provider edge device, an indication that the provider edge device is a primary neighbor of the customer edge device, wherein the forwarding comprises forwarding, by the provider edge device to the customer edge device via the redundant attachment circuit and in response to the indication the provider edge device is the primary neighbor of the customer edge device, the multicast traffic for the multicast group received on the L2VPN.

8. The method of claim 1, wherein the L2VPN comprises a Virtual Private Local Area Network Service (VPLS) instance.

9. A method comprising:
receiving, by a customer edge device of a local layer 2 (L2) network, configuration data for multi-homed connectivity with a layer 2 (L2) virtual private network (L2VPN) for a layer 3 (L3) network for switching L2 packet data units (PDUs) among two or more L2 networks connected to the L3 network including the local L2 network, wherein the configuration data for multi-homed connectivity configures the customer edge device with a primary attachment circuit to a primary neighbor provider edge device for the L2VPN and with a backup attachment circuit to a backup neighbor provider edge device for the L2VPN; and
generating and sending, by the customer edge device in response to snooping a multicast join message indicating a multicast group, a control plane message via the backup attachment circuit to the backup neighbor provider edge device for the L2VPN, wherein the control plane message is destined for the backup neighbor provider edge device for the L2VPN.

10. The method of claim 9, wherein the control plane message comprises one of a Label Distribution Protocol message and a Border Gateway Protocol message.

11. The method of claim 9, wherein the control plane message comprises a Label Distribution Protocol label mapping message specifying forwarding equivalence class traffic and a label that are usable by the backup neighbor provider edge device for mapping L2 PDUs, received for the L2VPN, matching the forwarding equivalence class traffic to the label and generating labeled L2 PDUs for forwarding to the customer edge device.

12. The method of claim 9, wherein the control plane message comprises a Label Distribution Protocol address message having a multicast address list type-length-value that specifies the multicast address of the multicast group.

13. The method of claim 9, further comprising:
forwarding, by the customer edge device, the multicast join message via the primary attachment circuit to the primary neighbor provider edge device for the L2VPN.

14. The method of claim 9, wherein the L2VPN comprises a Virtual Private Local Area Network Service (VPLS) instance.

15. The method of claim 9, wherein each of the primary attachment circuit and the backup attachment circuit comprises a different pseudowire.

16. The method of claim 9, further comprising:
sending, by the customer edge device to the backup neighbor provider edge device, a capabilities request message that requests an indication of whether the backup neighbor provider edge device has a capability for processing the control plane message that indicates the multicast group; and
generating and sending, by the customer edge device, the control plane message only if the backup neighbor provider edge device has the capability.

17. The method of claim 9, wherein the multicast join request comprises an Internet Group Management Protocol message.

18. The method of claim 9, further comprising:
detecting, by the customer edge device, failure of the primary attachment circuit;
performing, in response to the detecting, a switchover to the backup attachment circuit to forward L2 PDU for the L2VPN via the backup attachment circuit;
snooping, by the customer edge device, a subsequent multicast join message indicating the multicast group; and
forwarding, by the customer edge device, the multicast join message via the backup attachment circuit to the backup neighbor provider edge device for the L2VPN only after performing the switchover.

19. A system comprising:
a backup neighbor provider edge device, of a layer 3 network, configured to provide a layer 2 (L2) virtual private network (L2VPN) for the L3 network for switching L2 packet data units (PDUs) among two or more L2 networks connected to the L3 network;
a customer edge device of a local L2 network of the two or more L2 networks, the customer edge device configured with multi-homed connectivity with a primary attachment circuit to a primary neighbor provider edge device for the L2VPN and with a backup attachment circuit to the backup neighbor provider edge device,
wherein the customer edge device is configured to generate and send, in response to a snoop of a multicast join message indicating a multicast group, a control plane message via the backup attachment circuit to the backup neighbor provider edge device, wherein the control plane message is destined for the backup neighbor provider edge device,
wherein the backup neighbor provider edge device is configured to forward, to the customer edge device via the backup attachment circuit for the L2VPN and based at least on the control plane message, multicast traffic for the multicast group received from the L3 network.

20. A provider edge device comprising:
processing circuitry operably coupled to a memory comprising instructions for causing the processing circuitry to:
receive configuration data for a layer 2 (L2) virtual private network (L2VPN) for a layer 3 (L3) network for switching L2 packet data units (PDUs) among two or more L2 networks connected to the L3 network, wherein the configuration data configures the provider edge device as a neighbor having a redundant attachment circuit, for the L2VPN, with a customer edge device of a local L2 network of the two or more L2 networks;
receive, from the customer edge device via the redundant attachment circuit, when the provider edge device is a backup neighbor for the customer edge device, a control plane message destined for the provider edge device, the control plane message indicating a multicast group; and
forward, to the customer edge device via the redundant attachment circuit for the L2VPN and based at least on the control plane message, multicast traffic for the multicast group received from the L3 network.

21. A customer edge device comprising:
processing circuitry operably coupled to a memory comprising instructions for causing the processing circuitry to:
receive configuration data for multi-homed connectivity for a local layer 2 (L2) network with a L2 virtual private network (L2VPN) for a layer 3 (L3) network for switching L2 packet data units (PDUs) among two or more L2 networks connected to the L3 network including the local L2 network, wherein the configuration data for multi-homed connectivity configures the customer edge device with a primary attachment circuit to a primary neighbor provider edge device for the L2VPN and with a backup attachment circuit to a backup neighbor provider edge device for the L2VPN; and generate and send, in response to snooping a multicast join message indicating a multicast group, a control plane message via the backup attachment circuit to the backup neighbor provider edge device for the L2VPN, wherein the control plane message is destined for the backup neighbor provider edge device for the L2VPN.

* * * * *